(12) United States Patent
Chao et al.

(10) Patent No.: US 12,049,948 B2
(45) Date of Patent: Jul. 30, 2024

(54) GEAR WHEEL

(71) Applicant: Rolls-Royce Deutschland Ltd & Co KG, Blankenfelde-Mahlow (DE)

(72) Inventors: Chen-Xiang Chao, Berlin (DE); David Krüger, Potsdam (DE); Michael Nique, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 164 days.

(21) Appl. No.: 17/630,746

(22) PCT Filed: Jul. 30, 2020

(86) PCT No.: PCT/EP2020/071544
§ 371 (c)(1),
(2) Date: Jan. 27, 2022

(87) PCT Pub. No.: WO2021/019030
PCT Pub. Date: Feb. 4, 2021

(65) Prior Publication Data
US 2022/0316574 A1 Oct. 6, 2022

(30) Foreign Application Priority Data
Jul. 31, 2019 (DE) ................. 10 2019 211 451.2

(51) Int. Cl.
*F16H 55/14* (2006.01)
*F01D 15/12* (2006.01)
(Continued)

(52) U.S. Cl.
CPC ............... *F16H 55/14* (2013.01); *F02C 7/36* (2013.01); *F01D 15/12* (2013.01);
(Continued)

(58) Field of Classification Search
CPC .......... F16H 55/06; F16H 55/14; F16H 55/17; F16H 2055/185; F02C 7/36; F01D 15/12; F05D 2260/40311
See application file for complete search history.

(56) References Cited

U.S. PATENT DOCUMENTS 1,220,775 A * 3/1917 Murray .................. F16H 55/17
74/460
2,207,290 A * 7/1940 Hale ....................... F16H 55/14
301/63.101
(Continued)

FOREIGN PATENT DOCUMENTS

CN 205036822 2/2016
CN 110005783 A * 7/2019
(Continued)

OTHER PUBLICATIONS

Machine translation of WO 2011/080824 A1 obtained on Feb. 28, 2024.*
(Continued)

*Primary Examiner* — Adam D Rogers
(74) *Attorney, Agent, or Firm* — SHUTTLEWORTH & INGERSOLL, PLC; Timothy J. Klima

(57) ABSTRACT

The invention relates to a gear wheel for a transmission, comprising: including: a rim on which a toothing with a plurality of teeth is provided; a support point; and a web via which the rim is connected to the support point; wherein, on a side of the rim opposite the toothing and next to the web, a periodic variation of the geometry is formed that is aligned with the teeth of the toothing.

9 Claims, 7 Drawing Sheets

(51) Int. Cl.
  *F02C 7/36* (2006.01)
  *F16H 55/17* (2006.01)
  *F16H 55/06* (2006.01)
  *F16H 55/18* (2006.01)

(52) U.S. Cl.
  CPC .... *F05D 2260/40311* (2013.01); *F16H 55/06* (2013.01); *F16H 2055/185* (2013.01)

(56) References Cited

U.S. PATENT DOCUMENTS

| | | | | |
|---|---|---|---|---|
| 4,384,498 | A * | 5/1983 | Eichinger | F16H 55/14 |
| | | | | 475/345 |
| 5,271,287 | A * | 12/1993 | Wadleigh | B23K 20/12 |
| | | | | 74/439 |
| 8,006,582 | B2 * | 8/2011 | Miura | F16H 55/06 |
| | | | | 74/DIG. 10 |
| 8,100,026 | B2 * | 1/2012 | Suzuki | F16H 55/17 |
| | | | | 74/DIG. 10 |
| 8,141,450 | B2 * | 3/2012 | Haussecker | F16H 55/17 |
| | | | | 74/434 |
| 8,448,771 | B2 * | 5/2013 | Kuwashima | F16H 55/17 |
| | | | | 192/69.7 |
| 8,978,501 | B2 * | 3/2015 | Demtroder | F03D 15/10 |
| | | | | 29/893 |
| 10,371,244 | B2 * | 8/2019 | McCune | F16H 55/17 |
| 10,408,304 | B2 * | 9/2019 | Hallman | F16C 33/34 |
| 10,704,669 | B2 * | 7/2020 | Charrier | F16H 57/0427 |
| 10,744,566 | B2 * | 8/2020 | Clarke | B22F 5/08 |
| 11,047,466 | B1 * | 6/2021 | Kiyota | F16C 19/36 |
| 11,391,356 | B2 * | 7/2022 | Hu | F16H 55/06 |
| 11,680,631 | B2 * | 6/2023 | Kumar | F04B 53/00 |
| | | | | 74/434 |
| 11,680,632 | B2 * | 6/2023 | Stoppel | F16H 55/17 |
| | | | | 74/446 |
| 11,761,526 | B2 * | 9/2023 | Mauerlechner | F16H 55/17 |
| | | | | 74/446 |
| 11,852,230 | B2 * | 12/2023 | Mauerlechner | F16H 55/12 |
| 2002/0043124 | A1 | 4/2002 | Shiga et al. | |
| 2015/0047448 | A1 | 2/2015 | Ta et al. | |
| 2016/0146112 | A1 * | 5/2016 | Van der Merwe | F02C 7/36 |
| | | | | 475/331 |
| 2017/0108110 | A1 | 4/2017 | Sheridan | |
| 2018/0297119 | A1 | 10/2018 | Clarke | |
| 2019/0063370 | A1 * | 2/2019 | Phelps | F02C 7/36 |
| 2022/0099170 | A1 * | 3/2022 | Persson | F16H 57/0456 |
| 2023/0049420 | A1 * | 2/2023 | Otta | F16H 55/17 |

FOREIGN PATENT DOCUMENTS

| | | | | |
|---|---|---|---|---|
| DE | 102005021161 A1 | 12/2005 | | |
| DE | 102012102776 A1 | 10/2013 | | |
| EP | 1245869 A2 | 10/2002 | | |
| GB | 1391026 A * | 4/1975 | | B23K 15/04 |
| JP | H09242848 A | 9/1997 | | |
| JP | 200793012 | 10/2008 | | |
| WO | WO-2011080824 A1 * | 7/2011 | | F16H 55/17 |

OTHER PUBLICATIONS

German Search Report dated Mar. 4, 2020 from counterpart German Patent Application No. 10 2019 211 451.2.

International Search Report and Written Opinion dated Oct. 14, 2020 from counterpart International Patent Application No. PCT/EP2020/071544.

* cited by examiner

GEAR WHEEL

This application is the National Phase of International Application PCT/EP2020/071544 filed Jul. 30, 2020 which designated the U.S.

This application claims priority to German Patent Application No. 102019211451.2 filed Jul. 31, 2019, which application is incorporated by reference herein.

The present disclosure relates to a toothed gear for a gear box, to a gear box and to a gas turbine engine.

Toothed gears can be produced in the form of web-type toothed gears, referred to for short as web-type gears, or in the form of solid gears. In the case of web-type gears, an encircling toothing is seated on a rim which is connected to a support point, in particular a hub, via a web. The rim normally has a circular cylindrical inner side. Compared to the rim and the toothing, the web has a smaller thickness (width) in an axial direction in relation to the axis of rotation of the toothed gear. In this way, material can be saved, such that the weight of the toothed gear can be reduced. The web has, for example, the shape of a disk and can transmit a torque between the rim and the hub. On one or both sides, adjacent to the web, there is thus formed a space which is enclosed by the rim and which is for example in the form of a depression or pocket. Solid gears do not have a relatively thin section between the toothing and the hub, so that no web and no adjacent space is formed.

Compared to a solid gear, a web-type gear is generally of lower weight but typically has a lower load capacity.

It is the object of the present invention to provide a toothed gear which is of the lowest possible weight and which at the same time has the greatest possible load capacity.

According to one aspect, a toothed gear for a gear box is provided. The toothed gear comprises a rim, on which an (encircling) toothing with a multiplicity of teeth is provided, and a support point (in particular in the form of a bearing point and/or hub). At the support point, the toothed gear can be mounted rotatably or rotationally conjointly on another component. The support point and the rim are fixedly connected to one another via a web (in particular exactly one web). In an axial direction, the web has a smaller thickness than the rim and/or the toothing, and optionally also a smaller thickness than the support point. Here, at a side of the rim that is situated opposite the toothing (for example the inner side, in particular inner surface, of said rim), there is provided a geometry variation which is arranged adjacent to the web in an axial direction, in particular a (spatial) geometry variation (of the toothed gear, in particular of the rim, in particular of a surface thereof) which is periodic and (for example as viewed in a circumferential direction) aligned with the teeth of the toothing.

This is based on the finding that, during the use of toothed gears, in particular a respective particular region at each of the teeth of the toothing is subject to particularly high load, for example a tooth root region or a particular region of a tooth flank. In particular, by optimizing the tooth root curve, a load in the tooth base region can be increased. The optimum shape of the tooth root curve is generally dependent inter alia on the stiffness of the rim situated therebelow. The alternating regions with a tooth space or a tooth lying directly above the rim, as well as the spacing to the web, generally lead to a non-constant stiffness of the toothed gear body in an axial direction and a circumferential direction. These fluctuations in stiffness can be compensated for by means of a geometry variation which is aligned with the teeth. By providing a geometry variation which is aligned with the teeth, a reinforcement can be formed in each case for a particularly highly loaded region of each tooth, whilst material can be saved in relation thereto in the other sections of the rim. In this way, a toothed gear of particularly low weight can be formed, which at the same time has a particularly high load capacity.

The toothed gear may be mounted at the support point by means of a bearing. The support point may be a hub of a shaft-hub connection.

As a result of the variation, the geometry of the toothed gear, in particular of the rim, deviates from a circle, in particular from a circular cylinder, at the side that is (locally) remote from the toothing. The geometry of the toothed gear, in particular of the rim (for example an inner radius), at the side situated opposite the toothing varies in the circumferential direction. For example, the rim has different inner radii at different points in the circumferential direction. For example, at its side facing away from the toothing, the rim has a pattern which is aligned with the teeth of the toothing. The toothing is provided, for example, on the outer side of the rim, and the side situated opposite the toothing is then the inner side of the rim.

The toothing may be a straight toothing, a helical toothing, a symmetrical toothing or an asymmetrical toothing. Furthermore, the toothing may be a single helical toothing or a double helical toothing.

The web has, for example, the shape of a disk and may be of areal, in particular continuous design. The web may be arranged centrally or unilaterally toward one side of the toothed gear. The side situated opposite the toothing faces toward the support point, for example. The side situated opposite the toothing forms, for example, an inner surface of the rim. A recess, for example, adjoins the inner surface of the rim and extends (for example without interruption) around the axis of rotation of the toothed gear and/or from the inner side of the rim to the support point.

The toothed gear has an axis of rotation. Optionally, a radius relative to the axis of rotation to an inner surface of the rim varies in a circumferential direction around the axis of rotation, whereby the geometry variation is achieved. This means that certain regions of the rim (below the toothing) are thicker in the radial direction than others.

Alternatively or in addition, the radius relative to the axis of rotation to an inner surface of the rim may vary in an axial direction relative to the axis of rotation. In this way, a stiffness that would otherwise vary in an axial direction can be compensated for. It is consequently possible for a tooth shape, in particular tooth root curve, which is optimized for the respective application to be provided, which remains constant in an axial direction. This makes it possible to achieve a particularly high tooth root load capacity at every axial position.

The rim can have a respective rim geometry to the left and to the right of the web, wherein the rim geometry to the left of the web and the rim geometry to the right of the web are optionally of different design. As an alternative to this, the two rim geometries are of the same design. For example, the two rim geometries are of mirror-symmetrical design. Alternatively, the rim transitions into the web in a flush manner on one of the two sides.

The periodic geometry variation comprises, for example, the same number of periods as the toothing has teeth. To form the geometry variation, a multiplicity of periodically arranged and (for example inwardly) projecting regions may be formed, in particular in a number that is equal to the number of teeth of the toothing. The regions that project (for example inward) in relation to adjacent regions are for example each formed as a projection spaced apart from the support point, or alternatively connect the rim to the support point. Each of the (inwardly) projecting regions serves as a stiffening means for one or two teeth situated thereabove. According to one alternative, the inwardly projecting regions extend across multiple teeth and/or tooth spaces of the toothing, for example across in each case two or three teeth and/or tooth spaces, as viewed in the circumferential direction. The number of teeth and/or tooth spaces of the toothing may be the same as or different than the number of inwardly projecting regions, for example an integral multiple of the number of inwardly projecting regions.

Alternatively or in addition, to form the geometry variation, a region projecting inward from the rim may be formed in each case below a tooth space between two adjacent teeth (or below a plurality of adjacent tooth spaces). In many applications, the tooth root region in particular is particularly highly loaded. The tooth root regions can be reinforced, and thus provided with greater load capacity, by means of an inwardly projecting region below each of the tooth spaces. Furthermore, this also makes it possible to even better adapt the shape of the tooth roots to the respective application.

In each case two adjacent (for example inwardly) projecting regions have for example the same angular spacing to one another as the two teeth and/or tooth spaces that are nearest or situated thereabove. For example, the geometry variation that is aligned with the teeth of the toothing has the same periodicity as the toothing. Here, the inwardly projecting regions may for example be aligned in each case symmetrically with respect to the tooth spaces or asymmetrically with respect to the tooth spaces (for example in the case of asymmetrical toothings or unilaterally loaded toothed gears). In both cases, each period of the geometry variation is coupled to, and in this way aligned with, the spatial position of a tooth of the toothing.

The toothed gear is optionally formed as a single piece, in particular from a single material. The geometry variation is produced for example during a process of primary forming of the toothed gear and/or during cutting machining of the toothed gear.

According to one aspect, a toothed gear for a gear box is provided, comprising: a rim on which an encircling toothing with a multiplicity of teeth is provided, a support point (in particular in the form of a bearing point and/or hub), and a web via which the rim is connected to the support point. Here, a material variation is provided at a side of the rim that is situated opposite the toothing, in order to achieve an increase in stiffness of the rim. Specifically, a material with a specific stiffness that is similar to or higher than that of the material of the rim may be arranged at said side. A similar specific stiffness is assumed to be present for example if the specific stiffness of the material provided on that side of the rim which is situated opposite the toothing lies in the range of the specific stiffness of the material of the rim +/−15%, in particular +/−10%, in particular +/−5%. Alternatively, it is at least 5% more (or at least 10% more, in particular at least 15% more) than the specific stiffness of the material of the rim. For example, the specific stiffness of the material provided at that side of the rim which is situated opposite the toothing is at least 85%, in particular at least 90%, in particular at least 95%, in particular at least 100%, of the specific stiffness of the material of the rim. This, too, makes it possible to realize a toothed gear which has a particularly low weight and at the same time has a particularly high load capacity. Optionally, the toothed gear is additionally formed with a geometry variation that is aligned with the teeth of the toothing, as per the toothed gear described above, and/or with a material composition that is aligned with the teeth of the toothing. Optionally, the material provided at that side of the rim which is situated opposite the toothing has a specific stiffness of greater than 20e6 $m^2/s^2$, in particular of (approximately) 26e6 $m^2/s^2$ (or more).

For example, a ring composed of a material with a specific stiffness higher than that of the material of the rim is inserted into the rim. In this way, the rim can be reinforced particularly effectively.

The rim may comprise or be composed of a steel. Alternatively or in addition, the ring comprises or is composed of a carbon fiber reinforced plastic. Alternatively or in addition, the ring comprises steel and/or ceramic and/or one or more titanium alloys, or is alternatively composed of one or more of these materials. Optionally, the rim comprises or is composed of a steel, and the material provided on that side of the rim which is situated opposite the toothing (for example in the form of the ring) is a material which differs from the steel and which has a similar and/or higher specific stiffness.

The toothed gear is optionally designed for a gear box for driving a fan of a gas turbine engine at a lower rotational speed than a core shaft of the gas turbine engine, such that said toothed gear can withstand the loads encountered during the operation of the fan of the gas turbine engine.

It is pointed out that, alternatively or in addition to a periodic geometry variation of the rim that is aligned with the teeth of the toothing, a geometry variation in an axial direction is possible. Accordingly, according to one aspect, a toothed gear for a gear box is provided, comprising: a rim on which a toothing with a multiplicity of teeth is provided, a support point, and a web via which the rim is connected to the support point, wherein, at a side of the rim that is situated opposite the toothing and adjacent to the web in an axial direction (in relation to an axis of rotation of the toothed gear), a geometry variation is formed (which in particular deviates from a cylinder geometry). This toothed gear may optionally additionally comprise a periodic geometry variation of the rim that is aligned with the teeth of the toothing in accordance with any configuration described herein.

According to one aspect, a gear box is provided, optionally for driving a fan of a gas turbine engine at a lower rotational speed than a core shaft of the gas turbine engine. The gear box comprises a toothed gear, which comprises a rim on which a toothing with a multiplicity of teeth is provided, a support point, and a web via which the rim is connected to the support point. In this case, a geometry variation and/or a material variation (which is for example periodic and in particular aligned with the teeth) is provided at a side of the rim that is situated opposite the toothing and (for example in an axial direction and/or in a circumferential direction) adjacent to the web.

The toothed gear may be designed in accordance with any configuration described herein.

According to one aspect, a gas turbine engine for an aircraft is provided, which comprises the following: a core engine, which comprises a turbine, a compressor and a core shaft connecting the turbine to the compressor; a fan, which is positioned upstream of the core engine, wherein the fan comprises a plurality of fan blades; and a gear box, which can be driven by the core shaft, wherein the fan can be driven at a lower rotational speed than the core shaft by means of the gear box. It is provided here that the gear box is designed in accordance with any configuration described herein and/or comprises a toothed gear according to any configuration described herein.

Optionally, the turbine is a first turbine, the compressor is a first compressor, and the core shaft is a first core shaft, wherein the core engine furthermore comprises a second turbine, a second compressor, and a second core shaft connecting the second turbine to the second compressor. The second turbine, second compressor and second core shaft may be arranged so as to rotate at a higher rotational speed than the first core shaft.

As noted elsewhere herein, the present disclosure may relate to a gas turbine engine, for example an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be advantageous in particular, but not exclusively, for geared fans, which are driven via a gear box. Accordingly, the gas turbine engine may comprise a gear box which is driven via the core shaft and the output of which drives the fan in such a way that it has a lower rotational speed than the core shaft. The input to the gear box may be provided directly from the core shaft, or indirectly via the core shaft, for example via a spur shaft and/or spur gear. The core shaft may be rigidly connected to the turbine and the compressor, such that the turbine and compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may furthermore comprise a second turbine, a second compressor, and a second core shaft connecting the second turbine to the second compressor. The second turbine, second compressor and second core shaft may be arranged so as to rotate at a higher rotational speed than the first core shaft.

In such an arrangement, the second compressor may be positioned axially downstream of the first compressor. The second compressor may be arranged to receive (for example directly receive, for example via a generally annular duct) a flow from the first compressor.

The gear box may be designed to be driven by the core shaft that is configured to rotate (for example during use) at the lowest rotational speed (for example the first core shaft in the example above). For example, the gear box may be designed to be driven only by the core shaft that is configured to rotate (for example during use) at the lowest rotational speed (for example only by the first core shaft, and not the second core shaft, in the example above). Alternatively, the gear box may be designed to be driven by one or more shafts, for example the first and/or second shaft in the example above.

In a gas turbine engine as described and/or claimed herein, a combustor may be provided axially downstream of the fan and compressor (or compressors). For example, the combustor may be directly downstream of (for example at the exit of) the second compressor, when a second compressor is provided. By way of further example, the flow at the exit of the compressor may be supplied to the inlet of the second turbine, if a second turbine is provided. The combustor may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (i.e. the angle of attack may be variable). The row of rotor blades and the row of stator blades may be axially offset with respect to one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset with respect to one another.

Each fan blade may have a radial span extending from a root (or a hub) at a radially inner location over which gas flows, or from a position of 0% span, to a tip with a 100% span. The ratio of the radius of the fan blade at the hub to the radius of the fan blade at the tip may be less than (or of the order of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by two values in the previous sentence (i.e. the values may form upper or lower bounds). These ratios may be referred to in general as the hub-to-tip ratio. The radius at the hub and the radius at the tip may both be measured at the leading edge (or the axially forwardmost edge) of the blade. The hub-to-tip ratio refers, of course, to that portion of the fan blade over which gas flows, i.e. the portion radially outside any platform.

The radius of the fan may be measured between the engine centerline and the tip of the fan blade at its leading edge. The diameter of the fan (which can generally be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range bounded by any two of the values in the previous sentence (i.e. the values may form upper or lower bounds).

The rotational speed of the fan may vary in operation. Generally, the rotational speed is lower for fans with a larger diameter. Purely as a non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of a further non-limiting example, the rotational speed of the fan under cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

During the use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH of the flow. A fan tip loading may be defined as $dH/U_{tip}^2$, where dH is the enthalpy rise (for example the average 1-D enthalpy rise) across the fan and $U_{tip}$ is the (translational) speed of the fan tip, for example at the leading edge of the tip (which may be defined as fan tip radius at the leading edge multiplied by angular speed). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by an engine nacelle and/or a fan casing.

The overall pressure ratio of a gas turbine engine as described and/or claimed herein may be defined as the ratio of the ram pressure upstream of the fan to the ram pressure at the exit of the highest pressure compressor (before entry into the combustor). By way of a non-limiting example, the overall pressure ratio of a gas turbine engine as described and/or claimed herein at constant speed can be greater than (or of the order of): 35, 40, 45, 50, 55, 60, 65, 70, 75. The overall pressure ratio may be in an inclusive range bounded by any two of the values in the previous sentence (i.e. the values may form upper or lower bounds).

The specific thrust of an engine can be defined as the net thrust of the engine divided by the total mass flow through the engine. The specific thrust of an engine as described and/or claimed herein at cruise conditions may be less than (or of the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN or 550 kN. The maximum thrust may be in an inclusive range bounded by any two of the values in the previous sentence (i.e. the values may form upper or lower bounds). The thrust referred to above may be the maximum net thrust under standard atmospheric conditions at sea level plus 15° C. (ambient pressure 101.3 kPa, temperature 30° C.), with the engine static.

During use, the temperature of the flow at the entry to the high-pressure turbine can be particularly high. This temperature, which may be referred to as TET, may be measured at the exit to the combustor, for example immediately upstream of the first turbine blade, which itself may be referred to as a nozzle guide blade. At cruising speed, the TET may be at least (or of the order of): 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in the use of the engine may be at least (or of the order of), for example: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, under a high thrust condition, for example under a maximum take-off thrust (MTO) condition.

A fan blade and/or airfoil portion of a fan blade described and/or claimed herein may be produced from any suitable material or combination of materials. For example at least a part of the fan blade and/or airfoil may be produced at least in part from a composite, for example a metal matrix composite and/or an organic matrix composite, such as carbon fiber. As a further example, at least a part of the fan blade and/or airfoil may be produced at least in part from a metal, such as a titanium-based metal or an aluminum-based material (such as an aluminum-lithium alloy) or a steel-based material. The fan blade may comprise at least two regions produced using different materials. For example, the fan blade may have a protective leading edge, which is produced using a material that is better able to resist impact (for example from birds, ice or other material) than the rest of the blade. Such a leading edge may, for example, be produced using titanium or a titanium-based alloy. Thus, purely by way of example, the fan blade may have a carbon-fiber or aluminum-based body (such as an aluminum-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture device which may engage with a corresponding slot in the hub (or disk). Purely as an example, such a fixture device may be in the form of a dovetail that may slot into and/or be brought into engagement with a corresponding slot in the hub/disk in order to fix the fan blade to the hub/disk. As a further example, the fan blades may be formed integrally with a central portion. Such an arrangement may be referred to as a blisk or a bling. Any suitable method may be used to manufacture such a blisk or such a bling. For example, at least a part of the fan blades may be machined from a block and/or at least part of the fan blades may be attached to the hub/disk by welding, such as for example linear friction welding.

The gas turbine engines described and/or claimed herein may or may not be provided with a variable area nozzle (VAN). Such a variable area nozzle may allow the exit cross-sectional area of the bypass duct to be varied during operation. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any speed within these ranges may be the cruise condition. In the case of some aircraft, the cruise condition can be outside these ranges, for example below Mach 0.7 or above Mach 0.9.

Purely by way of example, the cruise conditions may correspond to standard atmospheric conditions at an altitude that is in the range of from 10 000m to 15 000m, for example in the range of from 10 000m to 12 000m, for example in the range of from 10 400m to 11 600m (around 38 000 ft), for example in the range of from 10 500m to 11 500m, for example in the range of from 10 600m to 11 400m, for example in the range of from 10 700m (around 35 000 ft) to 11 300m, for example in the range of from 10 800m to 11 200m, for example in the range of from 10 900m to 11 100m, for example of the order of 11 000m. The cruise conditions may correspond to standard atmospheric conditions at any given altitude in these ranges.

Purely as an example, the cruise conditions may correspond to the following: a forward Mach number of 0.8; a pressure of 23 000 Pa and a temperature of −55° C.

As used anywhere herein, "constant speed" or "constant speed conditions" can mean the aerodynamic design point. Such an aerodynamic design point (or ADP) may correspond to the conditions (comprising, for example, the Mach number, environmental conditions and thrust demand) for which the fan is designed to operate. This may mean, for example, the conditions at which the fan (or gas turbine engine) is designed to have optimum efficiency.

During operation, a gas turbine engine described and/or claimed herein may be operated under the cruise conditions defined elsewhere herein. Such cruise conditions may be determined by the cruise conditions (for example the conditions during the middle part of the flight) of an aircraft on which at least one (for example two or four) gas turbine engine(s) may be mounted in order to provide propulsive thrust.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

Embodiments will now be described by way of example, with reference to the figures, in which.

Figure 10:
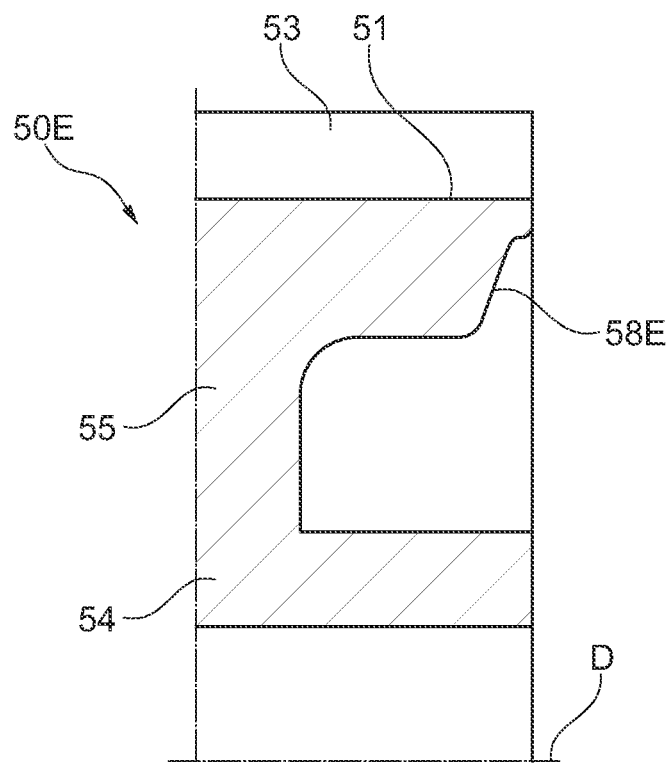
Figure 11:
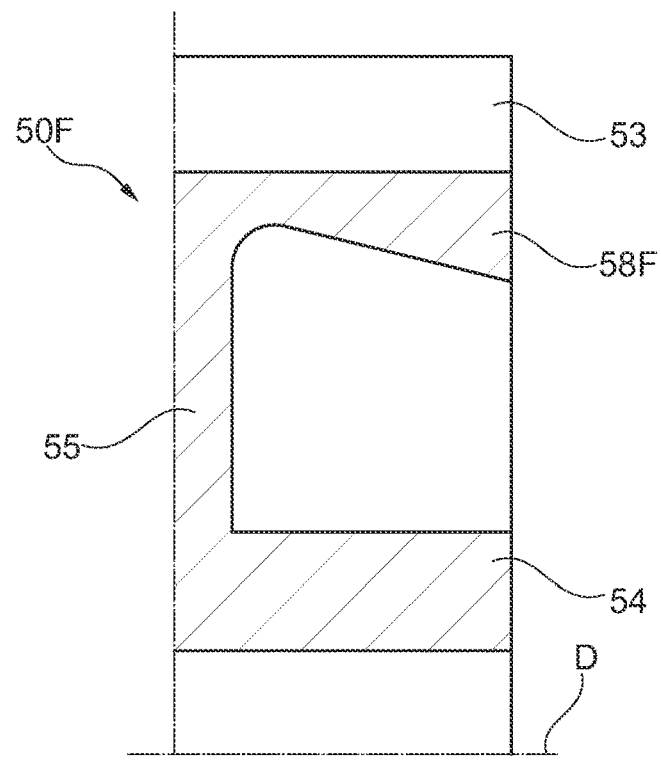
Figure 12:
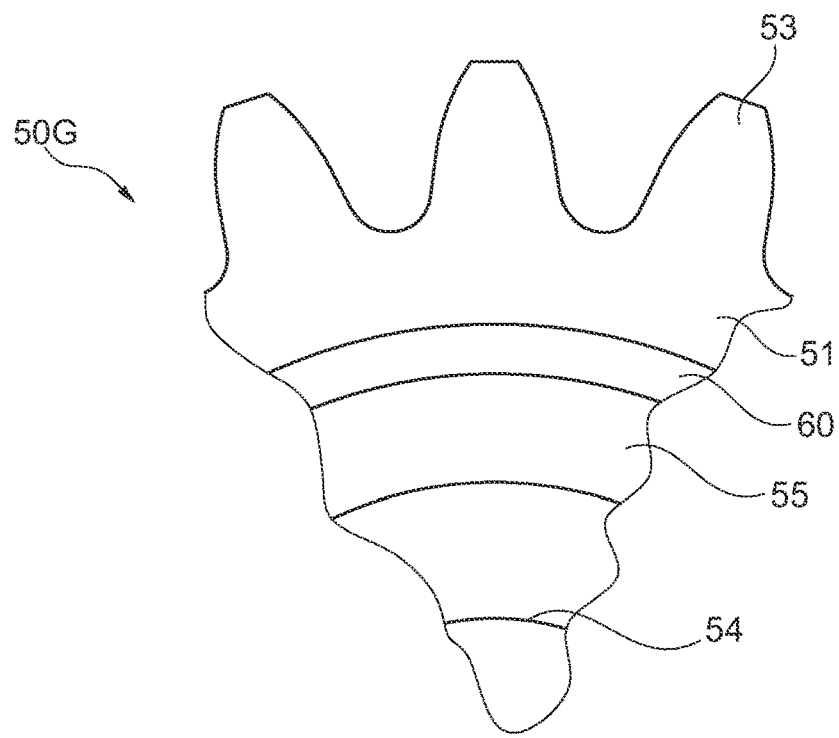

FIGS. 6 to 9 each show a partially cut-away view of a respective toothed gear in the form of a web-type gear;

FIGS. 10 and 11 each show a partially cut-away cross-sectional view of a respective toothed gear in the form of a web-type gear; and FIG. 12 shows a partially cut-away view of a respective toothed gear in the form of a web-type gear.

Figure 1:
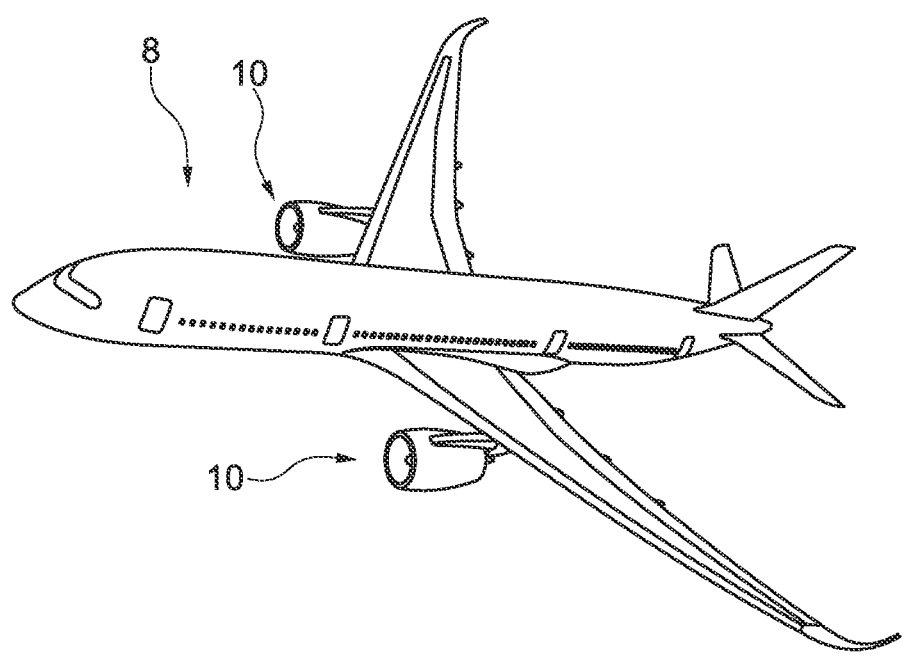
FIG. 1 shows an aircraft in the form of an airplane with several gas turbine engines.

FIG. 1 shows an aircraft 8 in the form of an airplane. The aircraft 8 comprises a plurality of gas turbine engines 10.

Figure 2:
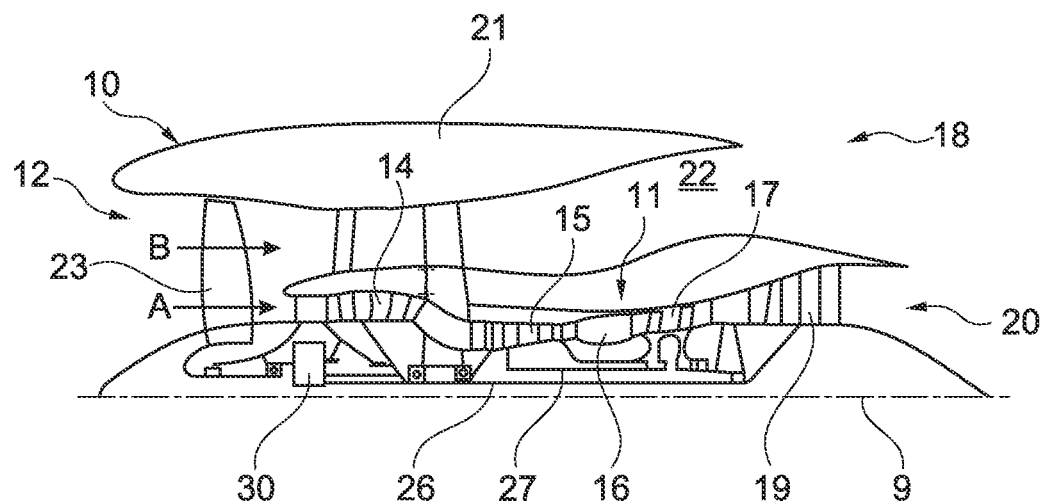
FIG. 2 shows a sectional side view of a gas turbine engine.

FIG. 2 illustrates one of the gas turbine engines 10 of the aircraft 8 having a main axis of rotation 9. The gas turbine engine 10 comprises an air inlet 12 and a fan 23 that generates two air flows: a core air flow A and a bypass air flow B. The gas turbine engine 10 comprises a core 11 that receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an epicyclic planetary gear box 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the propulsive thrust. The epicyclic planetary gear box 30 is a reduction gear box.

Figure 3:
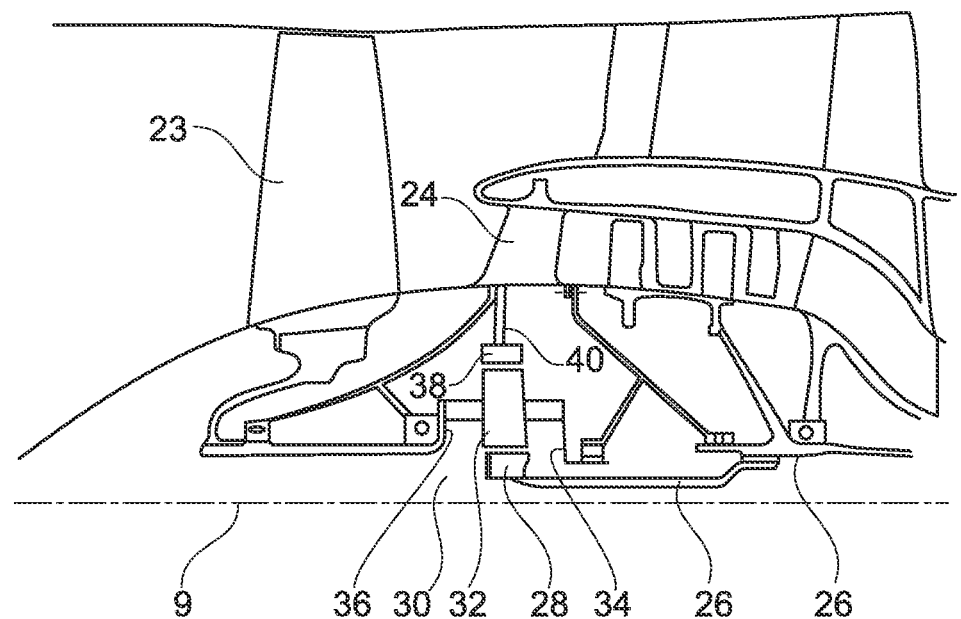
FIG. 3 shows a close-up lateral sectional view of an upstream portion of a gas turbine engine.

An exemplary arrangement for a geared fan gas turbine engine 10 is shown in FIG. 3. The low-pressure turbine 19 (see FIG. 2) drives the shaft 26, which is coupled to a sun gear 28 of the epicyclic planetary gear box 30. Multiple planet gears 32, which are coupled to one another by a planet carrier 34, are situated radially to the outside of the sun gear 28 and mesh therewith. The planet carrier 34 guides the planet gears 32 in such a way that they circulate synchronously around the sun gear 28, whilst enabling each planet gear 32 to rotate about its own axis. The planet carrier 34 is coupled via linkages 36 to the fan 23 in order to drive its rotation about the engine axis 9. Radially to the outside of the planet gears 32 and meshing therewith is an annulus or ring gear 38 that is coupled, via linkages 40, to a stationary support structure 24.

Note that the terms "low-pressure turbine" and "low-pressure compressor" as used herein may be taken to mean the turbine stage with the lowest pressure and the compressor stage with the lowest pressure (i.e. not including the fan 23) respectively and/or the turbine and compressor stages which are connected together by the interconnecting shaft 26 with the lowest rotational speed in the engine (i.e. not including the gear box output shaft which drives the fan 23). In some literature, the "low-pressure turbine" and the "low-pressure compressor" referred to herein can alternatively be known as the "intermediate-pressure turbine" and "intermediate-pressure compressor". Where such alternative nomenclature is used, the fan 23 can be referred to as a first, or lowest-pressure, compression stage.

Figure 4:
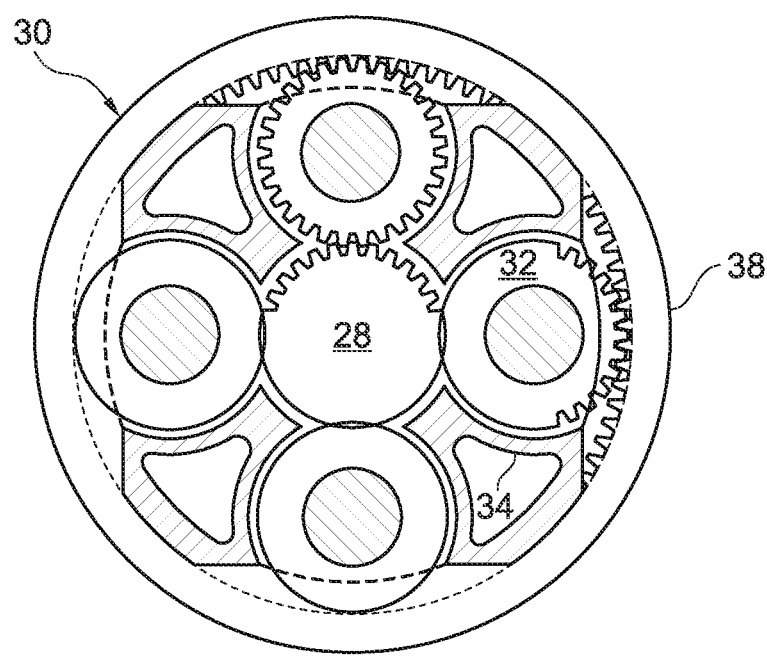
FIG. 4 shows a partially cut-away view of a gear box for a gas turbine engine.

The epicyclic planetary gear box 30 is shown by way of example in greater detail in FIG. 4. The sun gear 28, planet gears 32 and ring gear 38 in each case comprise teeth on their periphery to allow intermeshing with the other toothed gears. However, for clarity, only exemplary portions of the teeth are illustrated in FIG. 4. Although four planet gears 32 are illustrated, it will be apparent to the person skilled in the art that more or fewer planet gears 32 may be provided within the scope of protection of the claimed invention. Practical applications of an epicyclic planetary gear box 30 generally comprise at least three planet gears 32. The sun gear 28 and/or the planet gears 32 have a double helical toothing in the present example.

The epicyclic planetary gear box 30 illustrated by way of example in FIGS. 3 and 4 is a planetary gear box in which the planet carrier 34 is coupled to an output shaft via linkages 36, with the ring gear 38 being fixed. However, any other suitable type of planetary gear box 30 may be used. As a further example, the planetary gear box 30 may be a star arrangement, in which the planet carrier 34 is held fixed, with the ring gear (or external gear) 38 being allowed to rotate. In such an arrangement, the fan 23 is driven by the ring gear 38. As a further alternative example, the gear box 30 can be a differential gear box in which both the ring gear 38 and the planet carrier 34 are allowed to rotate.

It will be appreciated that the arrangement shown in FIGS. 3 and 4 is by way of example only, and various alternatives are within the scope of protection of the present disclosure. Purely by way of example, any suitable arrangement may be used for locating the gear box 30 in the gas turbine engine 10 and/or for connecting the gear box 30 to the gas turbine engine 10. As a further example, the connections (for example the linkages 36, 40 in the example of FIG. 3) between the gear box 30 and other parts of the gas turbine engine 10 (such as the input shaft 26, the output shaft and the fixed structure 24) may have a certain degree of stiffness or flexibility. As a further example, any suitable arrangement of the bearings between rotating and stationary parts of the gas turbine engine 10 (for example between the input and output shafts of the gear box and the fixed structures, such as the gear box casing) may be used, and the disclosure is not limited to the exemplary arrangement of FIG. 3. For example, where the gear box 30 has a star arrangement (described above), the person skilled in the art would readily understand that the arrangement of output and support linkages and bearing positions would typically be different to that shown by way of example in FIG. 3.

Accordingly, the present disclosure extends to a gas turbine engine having any arrangement of gear box types (for example star or epicyclic-planetary), supporting structures, input and output shaft arrangement, and bearing positions.

Optionally, the gear box may drive additional and/or alternative components (for example the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 2 has a split flow nozzle 20, 22, which means that the flow through the bypass duct 22 has its own nozzle, which is separate from the engine core nozzle 20 and is radially on the outside with respect to the latter. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable area. Whilst the described example relates to a turbofan engine, the disclosure may be applied, for example, to any type of gas turbine engine, such as an open-rotor (in which the fan stage is not surrounded by an engine nacelle) or turboprop engine, for example.

The geometry of the gas turbine engine 10, and components thereof, is/are defined by a conventional axis system, comprising an axial direction (which is aligned with the axis of rotation 9), a radial direction (in the bottom-to-top direction in FIG. 2), and a circumferential direction (perpendicular to the view in FIG. 2). The axial, radial and circumferential directions run so as to be mutually perpendicular.

Exemplary embodiments of toothed gears for the gear box 30 will be described below.

Figure 5:
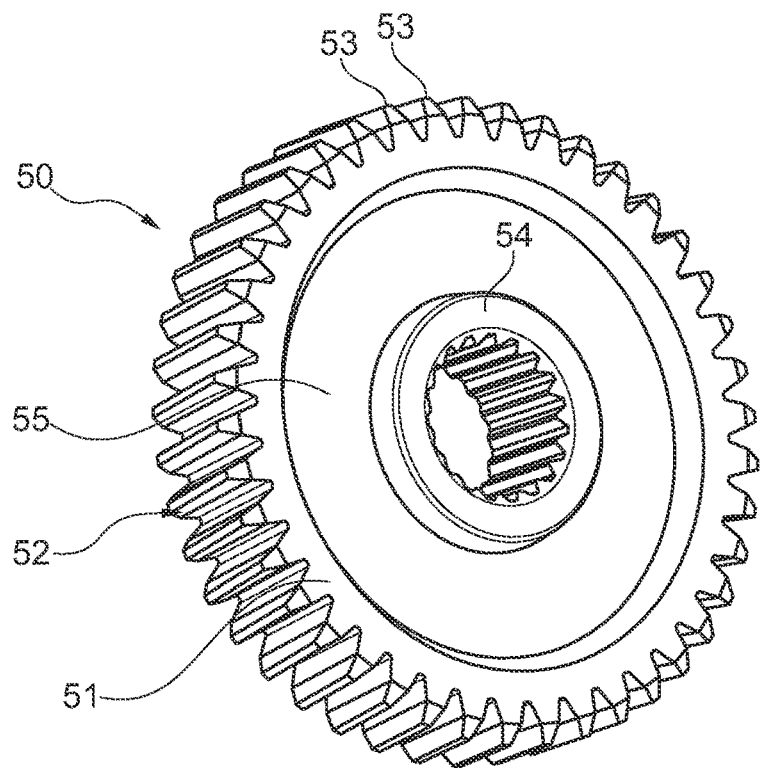
FIG. 5 shows a view of a toothed gear in the form of a web-type gear.

FIG. 5 shows a toothed gear 50 in the form of a spur gear. The toothed gear 50 comprises a rim 51 on which a toothing 52 is formed. The toothing 52 may be a straight toothing or alternatively also a helical toothing. Furthermore, the toothing 52 may be a double helical toothing (with two helices). Here, each helix may have its own web, or both helices have a common web.

The rim 51 has the shape of a circular hollow cylinder. The rim has an inner side and an outer side, with the toothing 52 being formed in encircling fashion on the outer side of the rim 51. The toothing 52 is seated on a continuous, circular cylindrical section of the rim 51. The toothing 52 has a multiplicity of teeth 53. The teeth 53 are in each case of solid form and formed from a single material. The teeth 53 are arranged concentrically around an axis of rotation of the toothed gear 50. Where reference is made below to an axial direction, a radial direction or a circumferential direction, this is taken to mean a direction relative to the axis of rotation of the toothed gear 50 or relative to the corresponding axis of rotation of the toothed gear respectively being described, unless explicitly stated otherwise.

For the rotatable or rotationally conjoint mounting of the toothed gear 50, the toothed gear 50 comprises a support point 54, for example in the form of a hub. The support point 54 is aligned coaxially with respect to the rim 51. Furthermore, the support point 54 is arranged in the interior of the rim 51. The support point 54 in this case has an internally encircling form-fit contour for rotationally conjoint connection to a shaft or axle, wherein other types of rotationally conjoint connection are also conceivable, for example a flange connection or a shrunk-on interference fit, or a rotatable connection to the axle or shaft.

In order to be able to transmit a torque between the toothing 52 and the support point 54, the toothing 52 and the support point 54 are fixedly connected to one another via a section referred to as a web 55. The rim 51, the toothing 52, the web 55 and the support point 54 are formed as a single piece (and from a single material). The toothed gear 50 is a web-type gear. By contrast to a solid gear, in the case of which there is generally no region of reduced width in relation to the toothing (as viewed in the axial direction) between a toothing and a support point, in the case of the toothed gear 50 the web 55 has a (significantly) smaller width than the toothing 53. This makes it possible for the weight of the toothed gear 50 to be considerably reduced in relation to a solid gear. The toothed gear 50 thus has at least one lateral recess. The web 55 may be arranged in a centered manner such that a recess is formed on both sides. Alternatively, the web 55 may be offset to one side or arranged entirely at one side. In the latter case, the web 55 transitions in a flush manner into the region of the rim 52 on one side of the toothed gear 50, and the toothed gear 50 has a recess only on the other side. In the example shown, the web 55 has no openings or the like.

The toothed gear 50 is produced from steel and as a single piece.

The teeth of web-type gears may commonly have a lower load capacity compared to solid gears. In this case, the same tooth can be subjected to higher loads in a region below which the web is arranged than in a region below which a recess is arranged. As a result, the load capacity of the toothed gear and the capacity for optimization of the tooth shape, in particular of the tooth root curve, for the respective application can be restricted.

Several examples of toothed gears 50A-50G, which each allow improved load capacity and optimization of the tooth shape, will be described below with reference also to FIGS. 6 to 12. The respective basic form of these toothed gears 50A-50G described below corresponds to that of the toothed gear 50 described above in conjunction with FIG. 5, such that only the respective differences in relation thereto will be described below.

Figure 6:
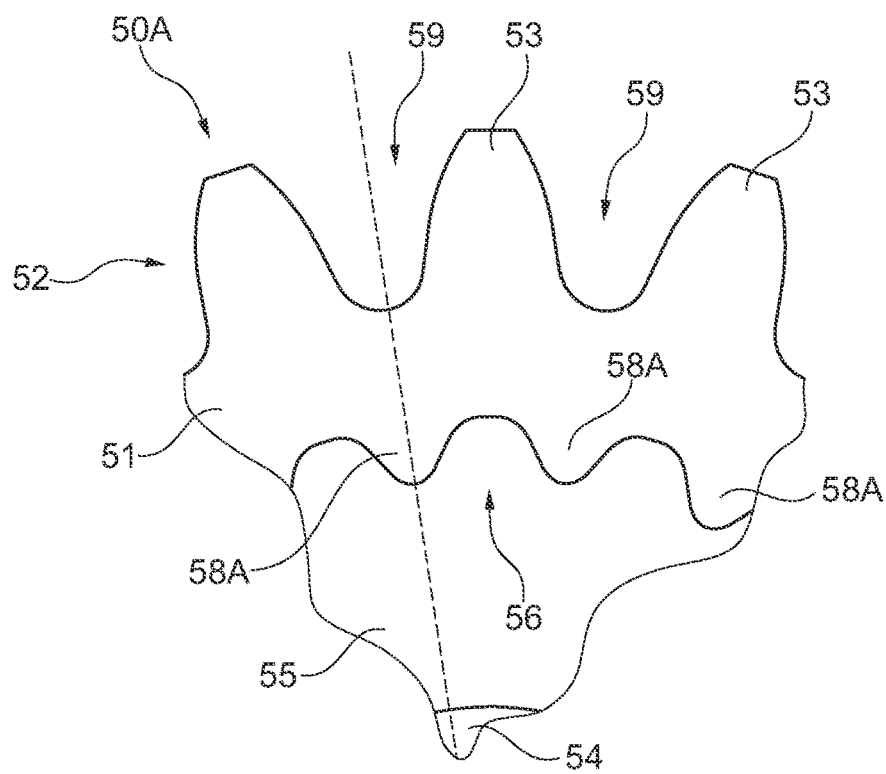

FIG. 6 shows a toothed gear 50A in the case of which, at a side of the rim 51 that is situated opposite the toothing 52, namely at the inner side 56 of the rim 51, a spatial geometry variation of the toothed gear 58A, in this case specifically of the rim 51, is provided which is aligned with the teeth 53 of the toothing 52 (in the circumferential direction). At its side facing away from the toothing 52, the rim 51 has a pattern which is aligned with the teeth 53 (and tooth spaces 39) of the toothing 52.

Here, the geometry variation is designed such that the radius of the inner surface of the rim 51 varies as viewed in a circumferential direction. Specifically, on the inner side 56 of the rim 51, there is formed a multiplicity of regions 58A that project inwardly (toward the axis of rotation of the toothed gear 50A). Each of the inwardly projecting regions 58A is formed as a projection. In the example as per FIG. 6, the inner surface of the rim 51 describes a waveform (alternatively, for example, a zigzag form or some other periodic form). The inwardly projecting regions 58A form local stiffening means.

The toothed gear 50A comprises the same number of inwardly projecting regions 58A as it does teeth 53. The inwardly projecting regions 58A are arranged periodically, specifically with the same angular spacings to one another as the teeth 53. The inwardly projecting regions 58A (generally the periodically arranged stiffening regions) are of identical design to one another.

Each of the inwardly projecting regions 58A has the same relative arrangement in relation to a respectively adjacent tooth 53, whereby the geometry variation of the rim 51 is aligned with the teeth 53 of the toothing 52. Owing to the alignment of the geometry variation (and of the surface shape) with the teeth 53, the teeth 53 can be supported in a uniform manner across their width. The inwardly projecting regions 58A in each case locally reinforce the rim 51. Depending on the specific application, the inwardly projecting regions 58A may in this case be arranged relative to the teeth 53 such that a particularly highly loaded region of each of the teeth 53 is selectively supported. This makes it possible for the toothed gear 50A to be designed to be of low weight but to nevertheless have a particularly good load capacity. In particular, the tooth root load capacity can be optimized. For example, a tooth root curve with better utilized reserves can be made possible.

In the example of FIG. 6, each of the inwardly projecting regions 58A is arranged below a tooth space 59 (radially further inward) between in each case two adjacent teeth 53. As illustrated by a dashed straight line in FIG. 6, the inwardly projecting regions 58A are in each case arranged under the respective tooth space 59 on a direct line along the radius with respect to the axis of rotation. The radially lowest point of each radially inwardly projecting region 58A lies on a direct line radially below the radially lowest point of the respective tooth space 59. The radially inwardly projecting regions 58A are arranged symmetrically relative to the respective nearest (in this case above-situated) tooth space(s) 59.

As a result, the toothed gear 50A can have a (locally) variable stiffness, which is increased for example for particularly highly loaded regions. The toothed gear 50A is a web-type toothed gear with a rim stiffness which is variable (in a circumferential direction) and which can have an optimized tooth root curve.

Figure 7:
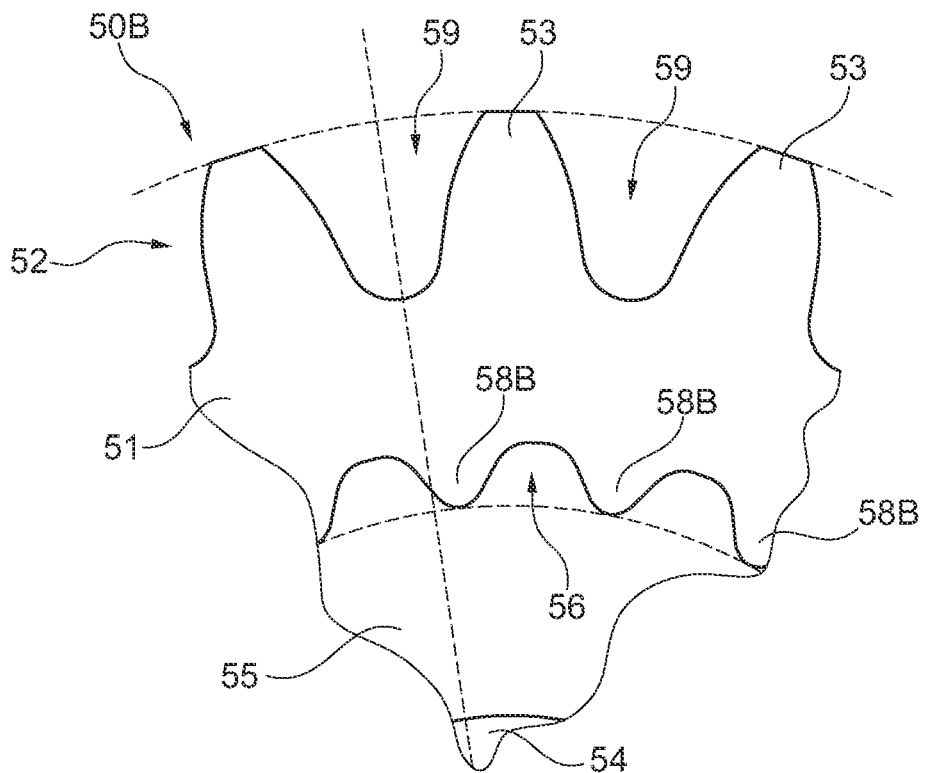

FIG. 7 shows a toothed gear 50B that is designed similarly to the toothed gear 50A according to FIG. 6, wherein, by contrast thereto, radially inwardly projecting regions 58B are arranged asymmetrically in relation to the respectively above-situated tooth space 59 (illustrated again on the basis of a dashed straight line). Here, the radially inwardly projecting regions 58A have in each case the same angular offset in relation to a respectively nearest tooth 53 (and correspondingly the respectively nearest tooth space 59), such that the geometry variation of the rim 51 that is formed by the radially inwardly projecting regions 58B is aligned with the teeth 53.

The geometry variation of the rim 51 may thus be aligned symmetrically or asymmetrically with the teeth 53 of the toothing 52. An asymmetric alignment may be selected in particular in the case of an asymmetrical load on the teeth 53 and/or an asymmetrical tooth shape, in particular tooth root shape.

Optionally, the inwardly projecting regions 58B (of the toothed gear 50B according to FIG. 7 or of the toothed gear according to another figure described herein) extend in accordance with a helix, for example in relation to the circumferential direction and the axial direction. For example, the toothing 52 is a helical toothing, and each of the inwardly projecting regions 58B follows (in the axial and circumferential directions) in each case one of the teeth 53. This optional configuration is illustrated in FIG. 7 using dashed lines.

Figure 8:
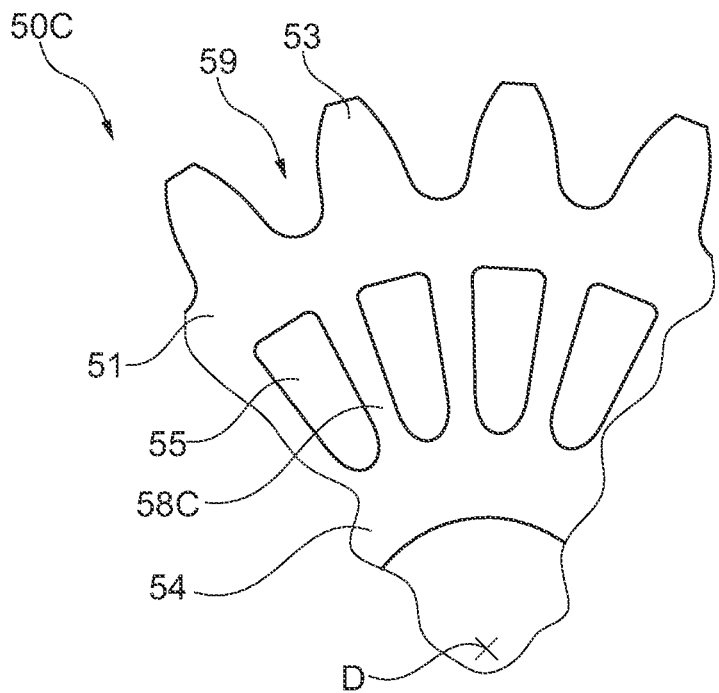

FIG. 8 illustrates that, in the case of a toothed gear 50C, radially inwardly projecting regions 58C can extend as far as the support point 54 (as an alternative to a configuration spaced apart therefrom). According to FIG. 8, each of the radially inwardly projecting regions 58C connects the rim 51 to the support point 54, which is designed for example as a hub or collar. The radially inwardly projecting regions 58C are aligned symmetrically with the teeth 53 of the toothing 52 and, in the present case, are arranged in each case centrally between two adjacent teeth 53 as viewed in a circumferential direction. The radially inwardly projecting regions 58C according to FIG. 8 can be referred to as spokes or as stiffening ribs. The arrangement of the spokes in a circumferential direction is aligned with the teeth 53, such that the thus formed geometry variation of the toothed gear 50C is also aligned with the teeth 53.

The regions 58C can be supported on a the support point 54, such that the toothed gear 50C can be designed with particularly high load capacity.

Figure 9:
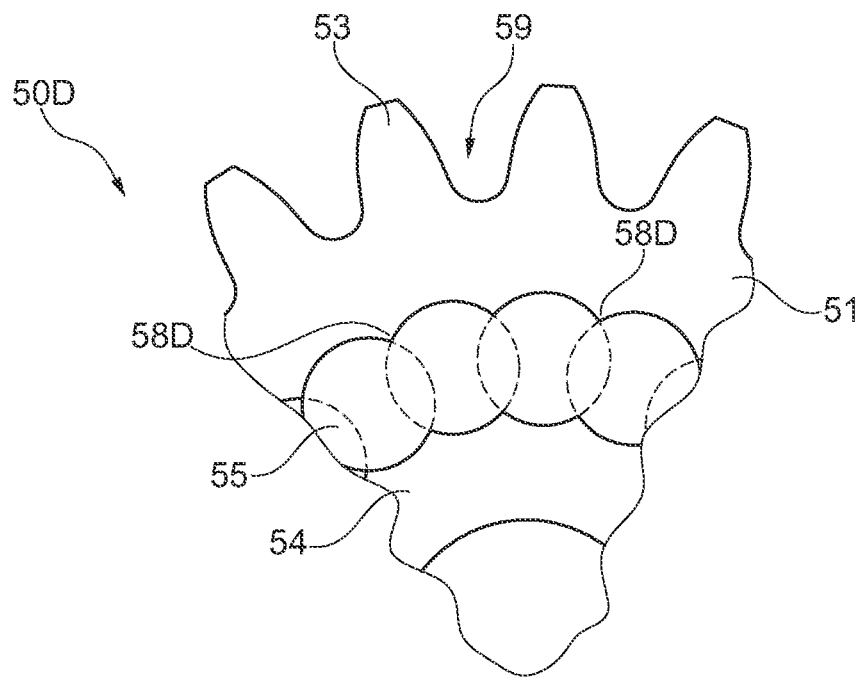

FIG. 9 shows a toothed gear 50D that is designed similarly to the toothed gear 50A according to FIG. 6. Radially inwardly projecting regions 58D are arranged symmetrically in each case below a tooth space 59.

The inwardly projecting regions 58D are in the present case formed by virtue of milled pockets or bores being formed into a solid gear, which is illustrated in FIG. 9 by dashed lines. This allows the toothed gear 50D to be easily produced from a solid gear.

In a corresponding production process, a solid wheel is firstly provided, into which, for example, several milled pockets and/or bores, for example in the form of blind holes, are then formed from one side (alternatively from in each case two opposite sides). Material is removed in a pattern that is aligned with the teeth 53 of the toothing 52. For example, a milled pocket/bore is formed below each tooth 53. For each tooth 53, in each case one milled pocket/bore is formed or generally material is locally removed (at one side or both sides of the toothed gear 50D). Each of the milled pockets/bores has the same positioning relative to the corresponding tooth 53.

The bores/milled pockets each have a circular cross section. The bores/milled pockets overlap one another. The in each case two overlapping bores/milled pockets result in a pointed shape for the inwardly projecting regions 58D, which is however also possible using other production methods, for example by casting of the toothed gear in a corresponding casting mold. The inwardly projecting regions 58D of the toothed gear 50D according to FIG. 9 have two concave flanks. Alternatively, the bores/milled pockets are spaced apart from one another, which can lead to spoke-like regions similar to FIG. 8.

In this way, a corresponding pattern with radially outwardly projecting projections is formed on the support point 54. Optionally, the support point 54 is subsequently machined on the outer circumference, for example using a lathe, in order to have a circular cylindrical outer lateral surface and in order to save further material.

As an alternative or in addition to the variations of the geometry in a circumferential direction according to FIGS. 6 to 9, it is also possible for a toothed gear to have a geometry variation in an axial direction. FIGS. 10 and 11 show two examples of this. Each of FIGS. 10 and 11 shows a respective toothed gear 50E, 50F with a rim 51 which, at its side opposite the toothing 52, in this case the inner side, has a region 58E, 58F which has a radius that varies in an axial direction in relation to the axis of rotation D, that is to say has a different radius at different points in the axial direction. Optionally, one of the toothed gears 50A-50D according to FIGS. 6 to 9 has a cross section according to FIG. 10 or 11, in particular at one of the inwardly projecting regions 58A-58D.

Here, FIG. 10 shows the toothed gear 50E, in the case of which, proceeding from the web 55, the radius firstly describes an (optional) rounding, then (likewise optionally) remains constant over a distance, and then widens, forming a rounding (with an opposite direction of curvature to the first-mentioned rounding). The rim 51 has the largest radius at or close to the outer side surface. The rim 51 is in particular reinforced adjacent to the web 55. A deformation of the rim 51 relative to the web 55 can be prevented in a particularly effective manner in this way.

FIG. 11 shows the toothed gear 50F, in the case of which, in an axial direction proceeding from the web 55, the radius firstly describes an (optional) rounding and then becomes continuously smaller. In this way, outer tooth regions in particular can be particularly strongly supported. FIG. 11 shows where the rim is arranged unilaterally toward a first side of the toothed gear and does not protrude from an opposite second side of the toothed gear. FIG. 11 also shows the rim having different rim geometries 58F and 54 on opposite sides of the web 55.

As already mentioned, the geometry variation in a circumferential direction (see in particular FIGS. 6 to 9) can be combined with the geometry variation in an axial direction. Here, the radially inwardly projecting regions 58A-58D and/or the intermediate areas may have a radius that varies in an axial direction.

The toothed gears 50E, 50F according to FIG. 10 and FIG. 11 may be designed as illustrated in FIGS. 10 and 11, with the web 55 being arranged at one side of the respective toothed gear 50E, 50F. It is alternatively possible, for example, for the toothed gears 50E, 50F to be designed in each case such that the web 55 is arranged centrally and the respective toothed gear 50E, 50F comprises a second half that corresponds to a mirror image of the halves shown in FIGS. 10 and 11.

FIG. 12 shows a toothed gear 50G, which is designed according to FIG. 5 and which additionally has a material variation at a side 56 of the rim 51 that is situated opposite the toothing 52, in order to achieve an increase in stiffness of the rim 51.

For this purpose, a ring 60 composed of a material with a higher specific stiffness than the material of the rim 51 (optional at least 5% higher, in particular at least 10% higher or at least 15% higher), specifically of a carbon fiber reinforced plastic, CFRP for short, is inserted into the rim 51. Alternatively or in addition, a stronger and/or stiffer steel (in relation to the material of the rim 51), and/or ceramic, can be used for the ring 60. In the present case, the ring 60 has the form of a circular hollow cylinder. Furthermore, for the ring 60, use may also be made of a material with a specific stiffness that is similar to that of the material of the rim 51, specifically, for example, with a specific stiffness of the level of the specific stiffness of the material of the rim 51 +/−15%, in particular +/−10%, in particular +/−5%. For example, the material of the ring 60 (generally of the material provided at that side of the rim 51 which is situated opposite the toothing 52) is a titanium alloy with a specific stiffness of at least 85%, in particular at least 90%, in particular at least 95%, of the specific stiffness of the material of the rim, wherein the material of the rim is for example a steel.

For example, the material of the ring 60 (generally of the material provided at that side of the rim 51 which is situated opposite the toothing 52) is a titanium alloy (in particular with a specific stiffness of approximately 23e6 $m^2/s^2$), CFRP (in particular with a specific stiffness of approximately 93e6 $m^2/s^2$) or a ceramic, for example silicon nitride (in particular with a specific stiffness of approximately 93e6 $m^2/s^2$), silicon carbide (in particular with a specific stiffness of approximately 131e6 $m^2/s^2$) or aluminum oxide (in particular with a specific stiffness of approximately 76e6 $m^2/s^2$).

In order to connect the (rest of the) toothed gear 50G to the ring 60 (generally a stiffening element), use may for example be made of form-fit, force-fit and cohesive techniques, in particular interference fit and/or adhesive connections.

A spacing and a cutout are formed between the ring 60 and the support point 54.

It is alternatively conceivable for one of the toothed gears 50A-50F of FIGS. 6 to 11 to be equipped with a ring 60, wherein, for example, an outer contour of the ring 60 is designed so as to engage in a fitting manner with the respective inner contour (with the inwardly projecting regions). According to a further alternative, the inner surface (generally the side facing away from the toothing 52) of the ring 60 is not of circular cylindrical design, but is formed with a geometry variation that is aligned with the teeth 53 of the toothing 52, for example in accordance with one of FIGS. 6 to 11.

Each of the toothed gears 50A-50G may be used in the gear box 30 of the gas turbine engine 10, for example as a sun gear 28 or planet gear 32. It is furthermore possible for the ring gear 38 to be designed correspondingly, wherein, in this case, the support point is situated at the outside and the toothing is situated at the inside. Since the gear box 30 transmits very high torques, the toothed gears of the gear box 30 are designed to be relatively large. A weight saving is thus of particular great benefit in the case of these toothed gears.

It will be understood that the invention is not limited to the embodiments described above, and various modifications and improvements can be made without departing from the concepts described herein. Any of the features may be used separately or in combination with any other features, unless they are mutually exclusive, and the disclosure extends to and includes all combinations and subcombinations of one or more features which are described here.

LIST OF REFERENCE SIGNS

9 Main axis of rotation
10 Gas turbine engine
11 Core engine
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Stationary supporting structure
26 Shaft
27 Connecting shaft
28 Sun gear
30 Gear box
32 Planet gears
34 Planet carrier
36 Linkage
38 Ring gear
40 Linkage
50, 50A-50G Toothed gear
51 Rim
52 Toothing
53 Tooth
54 Support point
55 Web
56 Inner side
58A-58F Region
59 Tooth space
60 Ring
A Core air flow
B Bypass air flow
D Axis of rotation

The invention claimed is:

1. A toothed gear for a gear box, comprising:
a rim on which a toothing with a plurality of teeth is positioned,
a support point,
a web via which the rim is connected to the support point, wherein, at a side of the rim that is situated opposite the toothing and adjacent to the web, a periodic geometry variation is formed which is aligned with the teeth of the toothing; and
wherein the rim has an increasing radial rim thickness with an increasing axial distance from the web;
wherein, to form the geometry variation, a region projecting inward from the rim is formed under a respective tooth space between two adjacent ones of the teeth,
wherein two adjacent inwardly projecting regions have a same angular spacing to one another as two adjacent ones of the tooth spaces positioned radially outwardly.

2. The toothed gear as claimed in claim 1, wherein the toothed gear has an axis of rotation, and a radius relative to the axis of rotation and to an inner surface of the rim varies in a circumferential direction about the axis of rotation.

3. The toothed gear as claimed in claim 1, wherein the rim has different rim geometries on opposite sides of the web.

4. The toothed gear as claimed in claim 1, wherein, to form the geometry variation, a number of periodically arranged and inwardly projecting regions are formed, wherein the number is equal to a number of teeth of the toothing.

5. The toothed gear as claimed in claim 1, wherein the toothed gear is formed as a single piece.

6. A gear box for driving a fan of a gas turbine engine at a lower rotational speed than a core shaft of the gas turbine engine, wherein the gear box comprises:
a toothed gear which comprises a rim, on which a toothing with a plurality of teeth is positioned,
a support point, and
a web via which the rim is connected to the support point,
wherein a geometry variation and/or material variation is provided at a side of the rim that is situated opposite the toothing and adjacent to the web, and
wherein the rim has an increasing radial rim thickness with an increasing axial distance from the web;
wherein, to form the geometry variation, a region projecting inward from the rim is formed under a respective tooth space between two adjacent ones of the teeth,
wherein two adjacent inwardly projecting regions have a same angular spacing to one another as two adjacent ones of the tooth spaces positioned radially outwardly.

7. A gas turbine engine for an aircraft, comprising:
a core engine comprising a turbine, a compressor, and a core shaft connecting the turbine to the compressor;
a fan which is positioned upstream of the core engine, wherein the fan comprises a plurality of fan blades; and
the gear box as claimed in claim 6, the gear box being driven by the core shaft, wherein the fan is driven by the gear box at a lower rotational speed than the core shaft.

8. The gas turbine engine as claimed in claim 7, wherein:
the turbine is a first turbine, the compressor is a first compressor, and the core shaft is a first core shaft;
the core engine further comprises a second turbine, a second compressor, and a second core shaft which connects the second turbine to the second compressor; and
the second turbine, second compressor, and second core shaft are arranged to rotate at a higher rotational speed than the first core shaft.

9. A toothed gear for a gear box, comprising:
a rim on which a toothing with a plurality of teeth is positioned,
a support point,
a web via which the rim is connected to the support point, wherein, at a side of the rim that is situated opposite the toothing and adjacent to the web, a periodic geometry variation is formed which is aligned with the teeth of the toothing; and wherein the rim is arranged unilaterally toward a first side of the toothed gear and does not protrude from an opposite second side of the toothed gear;

wherein, to form the geometry variation, a region projecting inward from the rim is formed under a respective tooth space between two adjacent ones of the teeth, wherein two adjacent inwardly projecting regions have a same angular spacing to one another as two adjacent ones of the tooth spaces positioned radially outwardly.

* * * * *